United States Patent
Shibata

(10) Patent No.: US 10,616,307 B2
(45) Date of Patent: Apr. 7, 2020

(54) DOCUMENT MANAGEMENT APPARATUS, TERMINAL APPARATUS, DOCUMENT MANAGEMENT SYSTEM, DOCUMENT MANAGEMENT METHOD, DOCUMENT BROWSING AND EDITING METHOD, AND NON-TRANSITORY COMPUTER READABLE MEDIUM

(71) Applicant: FUJI XEROX CO., LTD., Tokyo (JP)

(72) Inventor: Yayoi Shibata, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 593 days.

(21) Appl. No.: 14/665,590

(22) Filed: Mar. 23, 2015

(65) Prior Publication Data

US 2016/0285778 A1  Sep. 29, 2016
US 2017/0346879 A9  Nov. 30, 2017

(30) Foreign Application Priority Data

May 23, 2014 (JP) ................................. 2014-106962

(51) Int. Cl.
*H04L 29/08* (2006.01)
*H04W 4/029* (2018.01)

(52) U.S. Cl.
CPC .............. *H04L 67/06* (2013.01); *H04L 67/02* (2013.01); *H04L 67/1095* (2013.01); *H04L 67/325* (2013.01); *H04W 4/029* (2018.02)

(58) Field of Classification Search
CPC ... H04L 67/06; H04L 67/1095; H04L 67/325; H04L 67/02; H04W 4/028; H04W 4/029
See application file for complete search history.

(56) References Cited

U.S. PATENT DOCUMENTS

| 6,590,875 B1* | 7/2003 | Niwa ..................... H04B 1/745 370/328 |
| 6,597,906 B1* | 7/2003 | Van Leeuwen ..... H04W 64/006 455/422.1 |
| 8,073,446 B2* | 12/2011 | Ishii ...................... H04W 12/06 455/41.2 |
| 9,247,523 B1* | 1/2016 | Bhatia ..................... H04W 4/02 |

(Continued)

FOREIGN PATENT DOCUMENTS

| JP | 2003-242215 A | 8/2003 |
| JP | 2005-173641 A | 6/2005 |

(Continued)

OTHER PUBLICATIONS

Communication dated Feb. 20, 2018, from Japanese Patent Office in counterpart application No. 2014-106962.

*Primary Examiner* — Philip J Chea
*Assistant Examiner* — Wing Ma
(74) *Attorney, Agent, or Firm* — Sughrue Mion, PLLC

(57) ABSTRACT

A document management apparatus includes a first transmitting unit, a determination unit, and a second transmitting unit. The first transmitting unit transmits a first document to a terminal apparatus in response to a request from the terminal apparatus. The determination unit determines, based on a period of time for which it is predicted that communication between the terminal apparatus and the document management apparatus is disabled, a second document which is related to the first document. The second transmitting unit transmits the second document to the terminal apparatus.

15 Claims, 9 Drawing Sheets

(56) References Cited

U.S. PATENT DOCUMENTS

| | | | |
|---|---|---|---|
| 9,591,095 B2* | 3/2017 | Agarwal | G06F 16/95 |
| 2002/0159090 A1* | 10/2002 | Nobutani | G07G 1/14 |
| | | | 358/1.15 |
| 2004/0015504 A1* | 1/2004 | Ahad | G06F 16/24552 |
| 2004/0064577 A1* | 4/2004 | Dahlin | H04L 29/06 |
| | | | 709/235 |
| 2004/0068523 A1* | 4/2004 | Keith, Jr. | G06F 16/1787 |
| 2004/0179221 A1* | 9/2004 | Endo | H04N 1/00278 |
| | | | 358/1.13 |
| 2004/0198426 A1* | 10/2004 | Squibbs | H04W 99/00 |
| | | | 455/555 |
| 2005/0052679 A1* | 3/2005 | Green | G06F 3/1203 |
| | | | 358/1.14 |
| 2006/0004675 A1* | 1/2006 | Bennett | G06Q 10/08 |
| | | | 705/402 |
| 2006/0004927 A1* | 1/2006 | Rehman | G06F 16/95 |
| | | | 709/250 |
| 2006/0120313 A1* | 6/2006 | Moritomo | H04W 52/0225 |
| | | | 370/311 |
| 2006/0173860 A1* | 8/2006 | Ikebe | H04L 67/42 |
| 2007/0112970 A1* | 5/2007 | Kihara | H04L 12/4015 |
| | | | 709/230 |
| 2007/0124436 A1* | 5/2007 | Shepherd | G06F 3/1226 |
| | | | 709/223 |
| 2007/0198462 A1* | 8/2007 | Ohta | G06F 21/6209 |
| 2007/0239725 A1* | 10/2007 | Bhat | G06F 16/9574 |
| 2008/0215664 A1* | 9/2008 | Dibbern | H04L 67/14 |
| | | | 709/202 |
| 2008/0317026 A1* | 12/2008 | Vogl | G06Q 10/06 |
| | | | 370/389 |
| 2009/0100127 A1* | 4/2009 | Dasgupta | G06F 17/30132 |
| | | | 709/203 |
| 2010/0151840 A1* | 6/2010 | Bauchot | H04M 3/4872 |
| | | | 455/414.1 |
| 2010/0197282 A1* | 8/2010 | Uchida | G06F 21/6218 |
| | | | 455/414.1 |
| 2010/0250738 A1* | 9/2010 | Nagatani | H04L 41/0806 |
| | | | 709/224 |
| 2010/0290443 A1* | 11/2010 | Gabel | G07C 5/008 |
| | | | 370/338 |
| 2011/0013215 A1* | 1/2011 | Yonezawa | G06F 3/121 |
| | | | 358/1.14 |
| 2011/0035806 A1* | 2/2011 | Kramer | H04L 63/0428 |
| | | | 726/26 |
| 2011/0081895 A1* | 4/2011 | Ohashi | G06F 16/9574 |
| | | | 455/414.1 |
| 2011/0145287 A1* | 6/2011 | Jiang | G06F 17/2247 |
| | | | 707/780 |
| 2011/0231354 A1* | 9/2011 | O'Sullivan | G08G 1/0104 |
| | | | 706/46 |
| 2011/0239011 A1* | 9/2011 | Waris | H04W 4/38 |
| | | | 713/310 |
| 2011/0289136 A1* | 11/2011 | Klassen | H04N 1/32101 |
| | | | 709/203 |
| 2012/0163603 A1* | 6/2012 | Abe | G01S 5/0263 |
| | | | 380/278 |
| 2012/0190339 A1* | 7/2012 | Abe | H04W 48/16 |
| | | | 455/411 |
| 2012/0212766 A1* | 8/2012 | Imamoto | G06F 3/122 |
| | | | 358/1.14 |
| 2012/0220308 A1* | 8/2012 | Ledlie | G01S 5/0236 |
| | | | 455/456.1 |
| 2012/0224569 A1* | 9/2012 | Kubota | H04W 84/20 |
| | | | 370/338 |
| 2012/0254352 A1* | 10/2012 | Ito | G06F 17/30902 |
| | | | 709/217 |
| 2012/0259914 A1 | 10/2012 | Ando et al. | |
| 2013/0024570 A1* | 1/2013 | Mizoguchi | H04L 67/2819 |
| | | | 709/225 |
| 2013/0035118 A1* | 2/2013 | Hamano | H04W 4/021 |
| | | | 455/456.6 |
| 2013/0054514 A1* | 2/2013 | Barrett-Kahn | G06F 17/30902 |
| | | | 707/608 |
| 2013/0110796 A1* | 5/2013 | Butler | G06F 17/30011 |
| | | | 707/695 |
| 2013/0159552 A1* | 6/2013 | Xiang | H04L 69/40 |
| | | | 709/246 |
| 2013/0198270 A1* | 8/2013 | Yamauchi | G06F 13/00 |
| | | | 709/203 |
| 2013/0198361 A1* | 8/2013 | Matsuzaki | H04L 41/50 |
| | | | 709/223 |
| 2013/0208301 A1* | 8/2013 | Taniguchi | G06K 15/409 |
| | | | 358/1.14 |
| 2013/0229270 A1* | 9/2013 | Srinivasan | H04W 36/18 |
| | | | 340/328 |
| 2013/0262668 A1* | 10/2013 | Shiga | H04L 43/10 |
| | | | 709/224 |
| 2014/0115146 A1* | 4/2014 | Johnson | H04L 43/0876 |
| | | | 709/224 |
| 2014/0185581 A1* | 7/2014 | Senarath | H04W 36/0072 |
| | | | 370/331 |
| 2014/0189121 A1* | 7/2014 | Singhal | H04L 67/06 |
| | | | 709/226 |
| 2014/0282078 A1* | 9/2014 | Taylor | G06F 17/24 |
| | | | 715/751 |
| 2015/0029540 A1* | 1/2015 | Jo | G06F 3/1209 |
| | | | 358/1.15 |
| 2015/0181509 A1* | 6/2015 | Okamoto | H04W 48/16 |
| | | | 370/338 |
| 2015/0189499 A1* | 7/2015 | Miyazawa | G06F 3/121 |
| | | | 455/418 |
| 2015/0244784 A1* | 8/2015 | Abe | G01S 5/0263 |
| | | | 380/278 |
| 2015/0256641 A1* | 9/2015 | Agarwal | G06F 16/95 |
| | | | 709/203 |
| 2015/0268903 A1* | 9/2015 | Baba | G06F 3/1236 |
| | | | 358/1.15 |
| 2015/0312359 A1* | 10/2015 | Okabayashi | H04W 4/70 |
| | | | 709/203 |
| 2015/0346794 A1* | 12/2015 | Sakashita | G06F 1/266 |
| | | | 713/310 |
| 2015/0370513 A1* | 12/2015 | Mizoguchi | G06F 3/1285 |
| | | | 358/1.15 |
| 2016/0014194 A1* | 1/2016 | Kaplinger | H04L 67/06 |
| | | | 709/217 |
| 2016/0028912 A1* | 1/2016 | Harada | H04N 1/00923 |
| | | | 358/1.15 |
| 2016/0127592 A1* | 5/2016 | Nakamura | H04N 1/00923 |
| | | | 358/1.13 |
| 2016/0128119 A1* | 5/2016 | Maheshwari | H04W 76/023 |
| | | | 370/329 |
| 2016/0162227 A1* | 6/2016 | Kato | G06F 3/1227 |
| | | | 358/1.13 |
| 2016/0241728 A1* | 8/2016 | Naruse | H04N 1/00347 |
| 2016/0261769 A1* | 9/2016 | Yamada | H04N 1/4406 |
| 2016/0286024 A1* | 9/2016 | Cohn | H04M 1/72527 |
| 2017/0245314 A1* | 8/2017 | Ohhira | H04W 12/04 |

FOREIGN PATENT DOCUMENTS

| | | |
|---|---|---|
| JP | 2011-061714 A | 3/2011 |
| JP | 2011-082756 A | 4/2011 |
| JP | 2011-138209 A | 7/2011 |
| JP | 2012-221230 A | 11/2012 |

* cited by examiner

| DOCUMENT ID | DOWNLOAD LOCATION |
|---|---|
| Document-124 | +35.20.55.*, +35.20.55.*, +35.20.55.*, +35.20.55.*, +35.20.55.*** |
| Document-125 | +35.20.55.*, +35.20.55.* |
| Document-126 | +35.20.55.*, +35.20.55.*, +35.20.55.*, +35.20.55.* |
| Document-127 | +35.20.55.*, +35.20.55.*, +35.20.55.*** |
| Document-128 | +35.20.55.*** |
| Document-129 | +35.20.55.*, +35.20.55.*, +35.20.55.*, +35.20.55.*, +35.20.55.*** |
| ⋮ | ⋮ |
| ⋮ | ⋮ |

| USER ID | DOWNLOAD DOCUMENT ID | DATE AND TIME | BROWSING |
|---|---|---|---|
| User-1 | Document-454, Document-486, Document-123, Document-78, ⋯ | 5/1/2014 12:00 | YES |
| User-2 | Document-123, ⋯ | 5/1/2014 17:00 | NO |
| User-3 | Document-78, ⋯ | 5/2/2014 10:30 | YES |
| User-4 | Document-123, Document-78, ⋯ | 5/2/2014 15:10 | YES |
| User-5 | Document-454, Document-486, Document-123, ⋯ | 5/5/2014 10:00 | NO |
| ⋮ | ⋮ | ⋮ | ⋮ |
| ⋮ | ⋮ | ⋮ | ⋮ |

FIG. 7

| PERIOD (min) | DOCUMENT TO BE DOWNLOADED | | | |
|---|---|---|---|---|
| | (DOCUMENT INFORMATION a) DOCUMENT INFORMATION WHICH IS CURRENTLY BEING BROWSED | (DOCUMENT INFORMATION b) DOCUMENT INFORMATION WHICH HAS BEEN REGISTERED OR BROWSED MOST RECENTLY AND WHICH HAS DOWNLOAD HISTORY WITHIN N km RANGE | (DOCUMENT INFORMATION c) DOCUMENT INFORMATION WHICH HAS BEEN REGISTERED OR BROWSED IN THE PAST AND WHICH HAS DOWNLOAD HISTORY WITHIN N km RANGE | (DOCUMENT INFORMATION d) OTHER DOCUMENT INFORMATION STORED IN SAME FOLDER AS DOCUMENT INFORMATION WHICH IS CURRENTLY BEING BROWSED | (DOCUMENT INFORMATION e) DOCUMENT INFORMATION WHICH HAS DOWNLOAD HISTORY BEFORE REACHING CURRENT LOCATION |
| LESS THAN 1 | ✓ | ✓ | ✗ | ✗ | ✗ |
| 1 OR MORE AND LESS THAN 3 | ✓ | ✓ | ✓ | ✗ | ✗ |
| 3 OR MORE AND LESS THAN 10 | ✓ | ✓ | ✓ | ✓ | ✗ |
| 10 OR MORE | ✓ | ✓ | ✓ | ✓ | ✓ |

DOCUMENT MANAGEMENT APPARATUS, TERMINAL APPARATUS, DOCUMENT MANAGEMENT SYSTEM, DOCUMENT MANAGEMENT METHOD, DOCUMENT BROWSING AND EDITING METHOD, AND NON-TRANSITORY COMPUTER READABLE MEDIUM

CROSS-REFERENCE TO RELATED APPLICATIONS

This application is based on and claims priority under 35 USC 119 from Japanese Patent Application No. 2014-106962 filed May 23, 2014.

BACKGROUND

The present invention relates to a document management apparatus, a terminal apparatus, a document management system, a document management method, a document browsing and editing method, and a non-transitory computer readable medium.

SUMMARY

According to an aspect of the invention, there is provided a document management apparatus including a first transmitting unit, a determination unit, and a second transmitting unit. The first transmitting unit transmits a first document to a terminal apparatus in response to a request from the terminal apparatus. The determination unit determines, based on a period of time for which it is predicted that communication between the terminal apparatus and the document management apparatus is disabled, a second document which is related to the first document. The second transmitting unit transmits the second document to the terminal apparatus.

BRIEF DESCRIPTION OF THE DRAWINGS

Exemplary embodiments of the present invention will be described in detail based on the following figures, wherein:

FIG. 4 is a schematic diagram illustrating an example of a configuration of download location history information;

FIG. 5 is a schematic diagram illustrating an example of a configuration of download history information;

FIG. 7 is a diagram for explaining a determination operation for document information to be downloaded;

DETAILED DESCRIPTION

Exemplary Embodiment

Configuration of Document Management System

Figure 1:
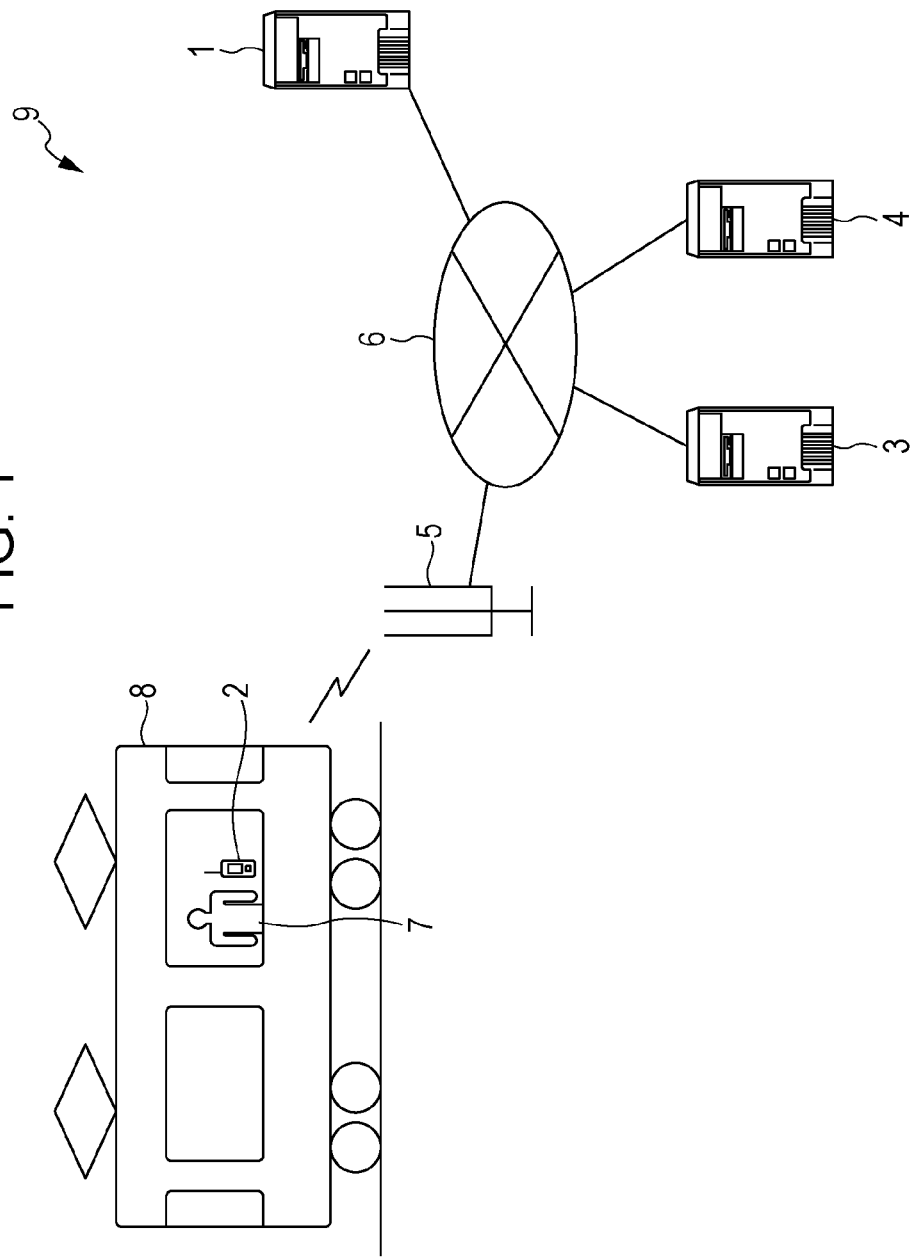
FIG. 1 is a schematic diagram illustrating an example of a configuration of a document management system according to an exemplary embodiment.

FIG. 1 is a schematic diagram illustrating an example of a configuration of a document management system according to an exemplary embodiment.

A document management system 9 includes a document management server 1, a terminal apparatus 2, a location information management server 3, and a radio wave condition management server 4 which are connected to one another through a network 6 so that they communicate with one another. The terminal apparatus 2 is connected to the network 6 through wireless communication with a base station 5. The terminal apparatus 2 is operated by a user 7, and for example, the terminal apparatus 2 moves along with the user 7 by a transportation 8.

The document management server 1 is a server-type document management apparatus which manages document information, and operates in response to a request from the terminal apparatus 2. The document management server 1 includes electronic parts, such as a central processing unit (CPU) which has a function of processing information and a flash memory. The document information is not limited to information, such as text information, image information, audio information, and moving image information, but may be information created by a specific application, such as word processing software, spread sheet software, or presentation software.

The terminal apparatus 2 is a terminal apparatus, such as a mobile phone, a smartphone, or a personal computer (PC). The terminal apparatus 2 includes electronic parts, such as a CPU which has a function of processing information and a flash memory.

The location information management server 3 is a server-type information processing apparatus which manages location information of the terminal apparatus 2, and operates in response to a request from the terminal apparatus 2. The location information management server 3 includes electronic parts, such as a CPU which has a function of processing information and a flash memory.

The radio wave condition management server 4 is a server-type information processing apparatus which manages a radio wave condition of the terminal apparatus 2, and operates in response to a request from the terminal apparatus 2. The radio wave condition management server 4 includes electronic parts, such as a CPU which has a function of processing information and a flash memory.

The network 6 is a communication network capable of high-speed communication, and is, for example, a wired or wireless communication network, such as the Internet or a local area network (LAN).

In the above configuration, when it is predicted that the radio wave condition of the terminal apparatus 2 will become degraded, the document management server 1 determines document information to be transmitted, based on the period of time from the degradation of the radio wave condition of the terminal apparatus 2 until recovery of the radio wave condition, and transmits (downloads) the document information to the terminal apparatus 2. The terminal apparatus 2 receives the document information and temporarily stores the document information in a storage section.

During the period in which the radio wave condition is degraded, the terminal apparatus 2 performs an operation, such as browsing and editing, on the document information stored in the storage section, in accordance with an operation by the user 7.

A radio wave condition under wireless communication will be described below. However, the present invention may be applied in a similar manner to a communication condition under wired communication. The degradation of the radio wave condition is an example of a cause for communication disability between the document management server 1 and the terminal apparatus 2. The present invention may also be applied to a case where it is easy to predict a time until communication becomes disabled by scheduled power cut, concentrated communication traffic, or the like, and the duration of the communication disability.

A configuration of individual apparatuses will be described below in detail.

Configuration of Document Management Server

Figure 2:
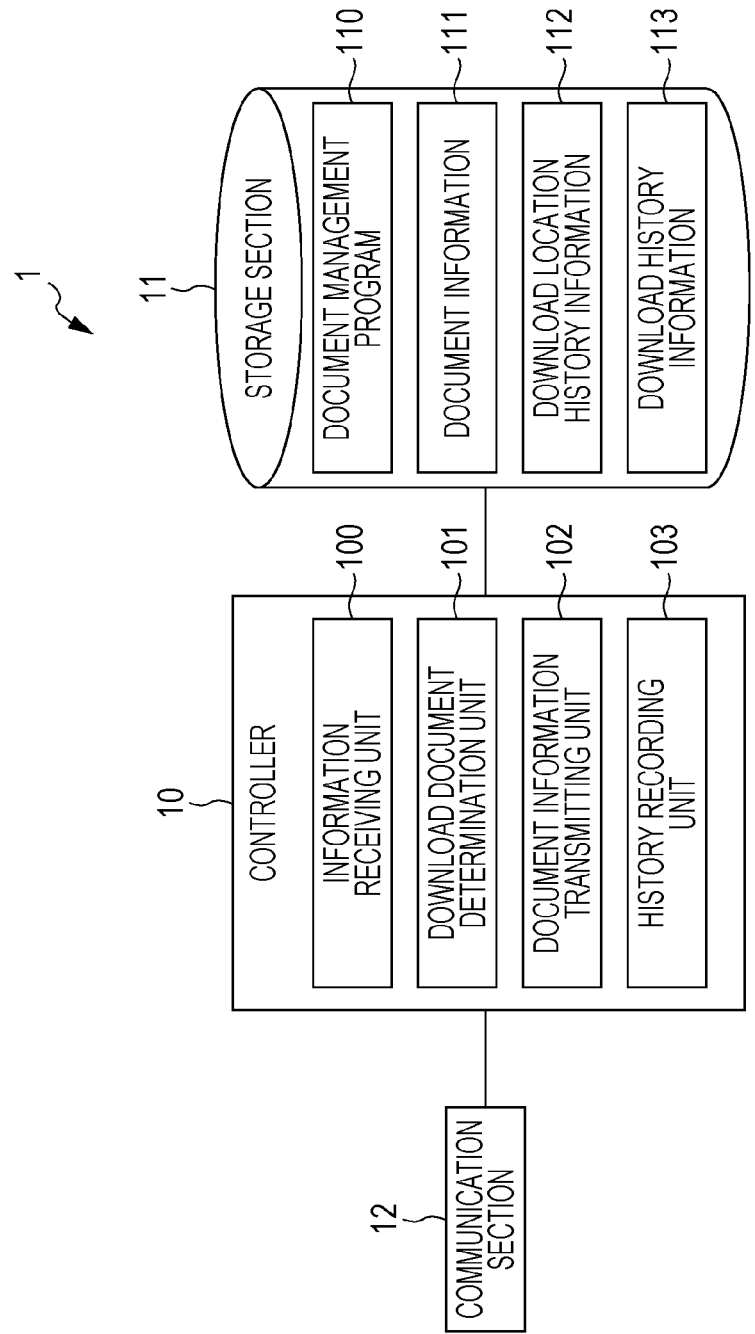
FIG. 2 is a block diagram illustrating a configuration example of a document management server.

FIG. 2 is a block diagram illustrating a configuration example of the document management server 1.

The document management server 1 includes a controller 10 which includes a CPU and the like to control individual sections and execute various programs, a storage section 11 which includes a storage medium, such as a flash memory, to store information, and a communication section 12 which communicates with an external device through a network.

The controller 10 functions as an information receiving unit 100, a download document determination unit 101, a document information transmitting unit 102, and a history recording unit 103 by executing a document management program 110, which will be described later.

The information receiving unit 100 receives a prediction result concerning a radio wave condition transmitted from the terminal apparatus 2.

The download document determination unit 101 determines, based on the prediction result received by the information receiving unit 100, document information to be downloaded to the terminal apparatus 2, from document information 111. A determination method will be explained in detail in "(2) Operation of document management server", which will be described below.

The document information transmitting unit 102 transmits the document information determined by the download document determination unit 101 to the terminal apparatus 2.

The history recording unit 103 records, as download location history information 112 or download history information 113, the document information transmitted by the document information transmitting unit 102 and location information of the terminal apparatus 2 or identification information of a user of the terminal apparatus 2, in association with each other.

The storage section 11 stores the document management program 110, which causes the controller 10 to operate as the units 100 to 103 described above, the document information 111, the download location history information 112, the download history information 113, and the like.

Configuration of Terminal Apparatus

Figure 3:
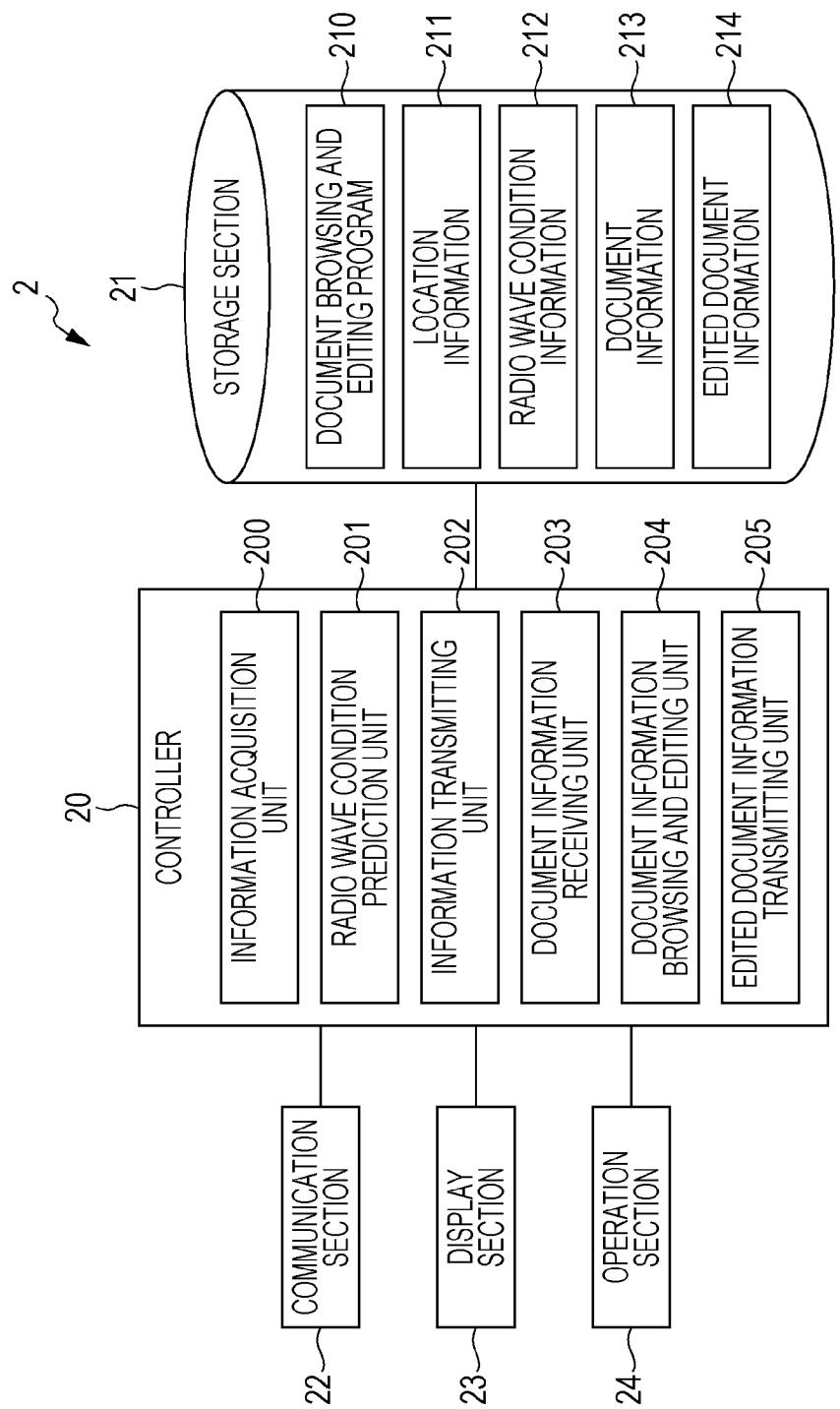
FIG. 3 is a block diagram illustrating a configuration example of a terminal apparatus.

FIG. 3 is a block diagram illustrating a configuration example of the terminal apparatus 2.

The terminal apparatus 2 includes a controller 20 which includes a CPU and the like to control individual sections and execute various programs, a storage section 21 which includes a storage medium, such as a flash memory, to store information, a communication section 22 which communicates with an external device through a network, a display section 23 which includes a liquid crystal display (LCD) to display text, images, and the like, and an operation section 24 which includes a button, a touch sensor, and the like to output an operation signal in accordance with an operation by the user 7.

The controller 20 functions as an information acquisition unit 200, a radio wave condition prediction unit 201, an information transmitting unit 202, and a document information receiving unit 203, a document information browsing and editing unit 204, an edited document information transmitting unit 205, and the like, by executing a document browsing and editing program 210, which will be described later.

The information acquisition unit 200 acquires location information 211 of the terminal apparatus 2 from the location information management server 3. The information acquisition unit 200 also acquires from the radio wave condition management server 4 radio wave condition information 212 which indicates a radio wave condition within a specific range, based on the location information 211, and stores the radio wave condition information 212 into the storage section 21.

The radio wave condition prediction unit 201 calculates the moving direction and speed of the terminal apparatus 2, based on the location information 211, and for example, predicts whether or not the radio wave condition will be degraded in three minutes. Furthermore, when the radio wave condition prediction unit 201 predicts that the radio wave condition will be degraded in three minutes, the radio wave condition prediction unit 201 predicts the period of time from the degradation of the radio wave condition until recovery of the radio wave condition.

The information transmitting unit 202 transmits the prediction result predicted by the radio wave condition prediction unit 201 to the document management server 1. The information transmitting unit 202 also transmits a request, such as a browsing request for document information, to the document management server 1.

The document information receiving unit 203 receives document information 213 from the document management server 1, and stores the document information 213 into a temporary storage area (cache) of the storage section 21. The cache may be a volatile memory, or alternatively, a temporary one prepared in a nonvolatile memory.

The document information browsing and editing unit 204 displays the content of the document information 213 on the display section 23 in accordance with operation content on the operation section 24 by the user 7, and edits the content. When editing is performed, the content is stored as edited document information 214 in the storage section 21.

The edited document information transmitting unit 205 transmits the edited document information 214, which is edited by the document information browsing and editing unit 204 in a period during which the radio wave condition is degraded, to the document management server 1, and issues a request to overwrite the content of the document information 111 on the document management server 1 by the edited document information 214.

The storage section 21 stores the document browsing and editing program 210, which causes the controller 20 to operate as the units 200 to 205 described above, the location information 211, the radio wave condition information 212, the document information 213, the edited document information 214, and the like.

FIG. 4 is a schematic diagram illustrating an example of a configuration of the download location history information 112.

The download location history information 112 is information recorded by the document management server 1, and includes a document ID field for identifying document information, and a download location field for indicating the location of the terminal apparatus 2 at the time when the document information of the document ID is downloaded from the document management server 1 to the terminal apparatus 2.

FIG. 5 is a schematic diagram illustrating an example of a configuration of the download history information 113.

The download history information 113 is information recorded by the document management server 1, and includes a user ID field for identifying a user who is using the terminal apparatus 2 at the time when document information is downloaded from the document management server 1 to the terminal apparatus 2, a document ID field for identifying the downloaded document information, a date and time field for indicating the date and time at which the document information is downloaded, and a browsing field for indicating whether or not the downloaded document information has been browsed on the terminal apparatus 2.

Operation of Document Management System

Next, operation of an exemplary embodiment will be described on (1) basic operation, (2) operation A of terminal apparatus, (3) operation of document management server, and (4) operation B of terminal apparatus.

(1) Basic Operation

First, in the state (normal state) where the terminal apparatus 2 is able to communicate with the document management server 1 under a good radio wave condition, the terminal apparatus 2 specifies, in accordance with operation content by the user 7, document information that the user 7 desires to browse, and issues a browsing request for the document information.

On receiving the browsing request for the document information, the document management server 1 transmits, by the document information transmitting unit 102, the specified document information to the terminal apparatus 2.

The document information receiving unit 203 of the terminal apparatus 2 receives the document information from the document management server 1, and temporarily stores the document information as the document information 213 into the storage section 21.

With the above operation, even if the radio wave condition of the terminal apparatus 2 is degraded, the document information browsing and editing unit 204 is able to display and edit the document information 213 in the storage section 21.

(2) Operation A of Terminal Apparatus

Next, an operation of the terminal apparatus 2 in the state (degraded state) where the terminal apparatus 2 will become unable to communicate with the document management server 1 under a degraded radio wave condition will be described.

Figure 8:
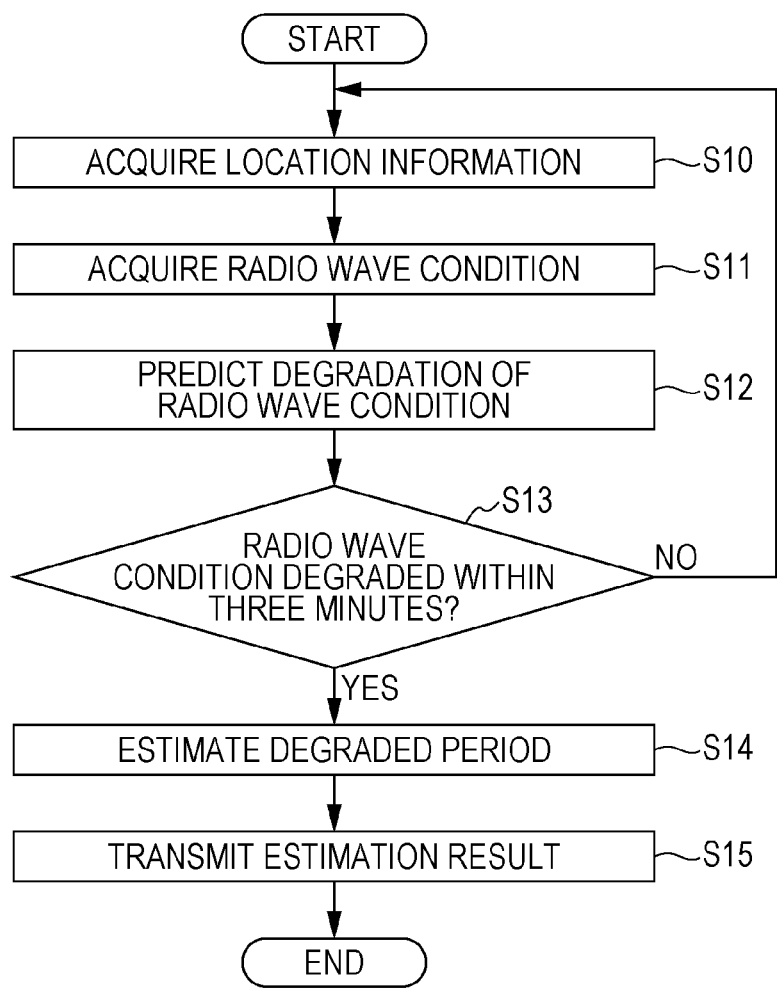
FIG. 8 is a flowchart illustrating an example of an operation of the terminal apparatus.

FIG. 8 is a flowchart illustrating an example of an operation of the terminal apparatus 2.

First, the information acquisition unit 200 of the terminal apparatus 2 acquires from the location information management server 3 the location information 211 of the terminal apparatus 2 (S10). The information acquisition unit 200 also acquires from the radio wave condition management server 4 the radio wave condition information 212 which indicates a radio wave condition within a specific range, based on the location information 211 (S11), and stores the radio wave condition information 212 into the storage section 21.

The radio wave condition prediction unit 201 calculates the moving direction and speed of the terminal apparatus 2, based on the location information 211, and for example, predicts whether or not the radio wave condition will be degraded (whether or not a radio wave condition will enter the degraded state) in three minutes (S12).

Figure 6:
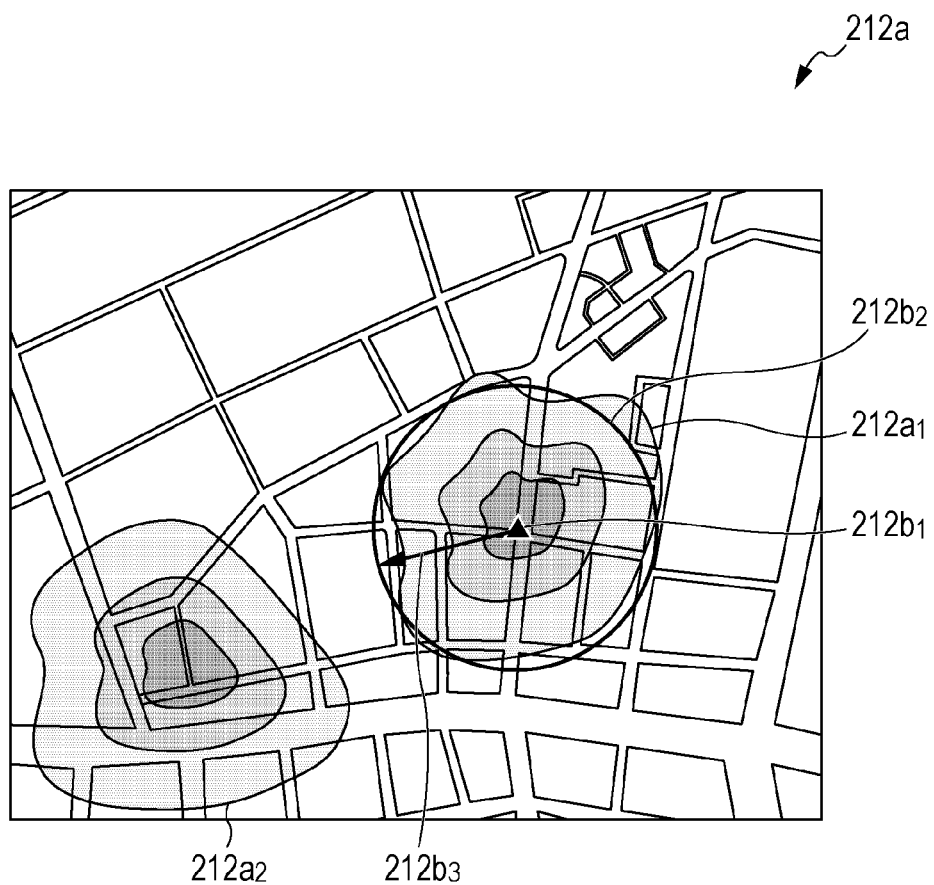
FIG. 6 is a diagram for explaining a basic operation of the document management system.

FIG. 6 is a diagram for explaining a basic operation of the document management system 9.

Radio wave condition information 212a, which is an example of the radio wave condition information 212, defines areas on a map where radio waves reach the terminal apparatus 2 as areas $212a_1$ and $212a_2$. Furthermore, a current location $212b_1$ of the terminal apparatus 2 is defined by the location information 211, and the area and direction of the terminal apparatus 2 within three minutes of moving are predicted as a range $212b_2$ and a travelling direction $212b_3$ in accordance with the moving speed of the terminal apparatus 2.

In the case where the range $212b_2$ is outside the area $212a_1$, the radio wave condition prediction unit 201 predicts that the radio wave condition will be degraded in three minutes. In contrast, in the case where the range $212b_2$ is inside the area $212a_1$, the radio wave condition prediction unit 201 predicts that the radio wave condition will not be degraded in three minutes.

When the radio wave condition prediction unit 201 predicts that the radio wave condition will be degraded in three minutes (S13; Yes), the radio wave condition prediction unit 201 predicts the period of time from the degradation of the radio wave condition until recovery of the radio wave condition (S14). In the example illustrated in FIG. 6, the period of time is predicted based on a difference between the time required for the terminal apparatus 2 to reach the next appearing area $212a_2$ on the assumption that the terminal apparatus 2 moves in the travelling direction $212b_3$ of the terminal apparatus 2, and the time required for the terminal apparatus 2 to exit from the area $212a_1$.

Next, the information transmitting unit 202 transmits the prediction result predicted by the radio wave condition prediction unit 201 to the document management server 1 (S15).

(3) Operation of Document Management Server

Figure 9:
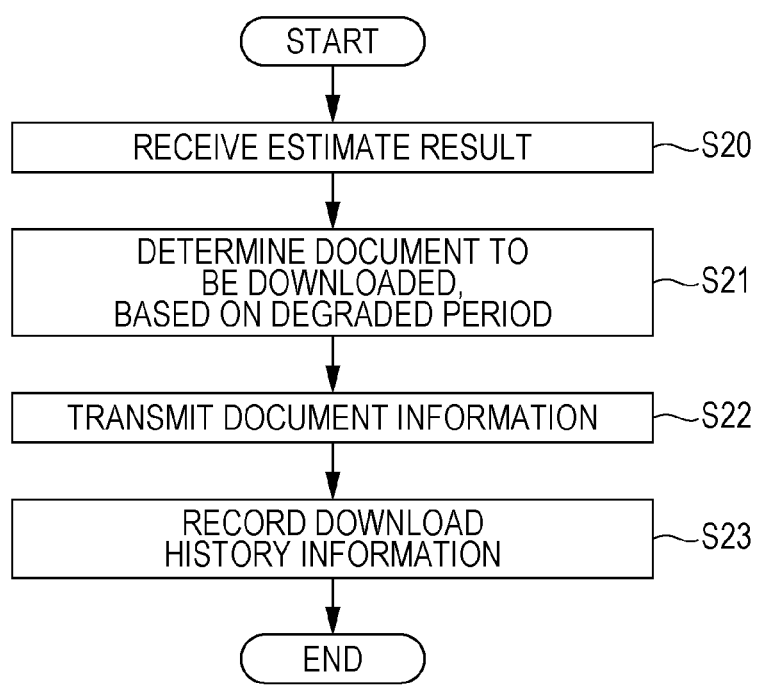
FIG. 9 is a flowchart illustrating an example of an operation of the document management server.

FIG. 9 is a flowchart illustrating an example of an operation of the document management server 1.

First, the information receiving unit 100 of the document management server 1 receives a prediction result transmitted from the terminal apparatus 2 (S20).

The download document determination unit 101 determines, based on the prediction result received by the information receiving unit 100, document information to be downloaded to the terminal apparatus 2, from the document information 111 (S21).

FIG. 7 is a diagram for explaining a determination operation for document information to be downloaded.

Radio Wave Degraded Period: Less than One Minute

In the case where the prediction result received by the information receiving unit 100 indicates that the period from the degradation of the radio wave condition until the recovery of the radio wave condition is less than one minute, the download document determination unit 101 determines, as the document information to be downloaded, document information (document information a) that is currently being browsed on the terminal apparatus 2, and document information (document information b) which has been registered or browsed most recently and has a history of being downloaded by someone within an N km range from the current location of the terminal apparatus 2.

The download document determination unit 101 searches for, based on the download location history information 112 illustrated in FIG. 4, document information which has a history of being downloaded within an N km range from the current location of the terminal apparatus 2, and searches for, based on the download history information 113 illustrated in FIG. 5, document information which has a most recent date and time in the date and time field, for example, document information downloaded within three days. Then, the download document determination unit 101 defines the document information which satisfies both the conditions as the document information b.

Radio Wave Degraded Period: One Minute or More and Less than Three Minutes

In the case where the period from the degradation of the radio wave condition until the recovery of the radio wave condition is equal to or more than one minute and less than three minutes, the download document determination unit 101 determines, as the document information to be downloaded, in addition to the document information a and the document information b, document information (document information c) which has been registered or browsed in the past and which has a history of being downloaded by someone within an N km range from the current location of the terminal apparatus 2.

The download document determination unit 101 searches for, based on the download location history information 112 illustrated in FIG. 4, document information which has a history of being downloaded within an N km range from the current location of the terminal apparatus 2, and defines the found document information as the document information c.

Radio Wave Degraded Period: Three Minutes or More and Less than Ten Minutes

In the case where the period from the degradation of the radio wave condition until the recovery of the radio wave condition is equal to or more than three minutes and less than ten minutes, the download document determination unit 101 determines, as the document information to be downloaded, in addition to the document information a, the document information b, and the document information c, document information (document information d) which is stored in the same folder as the document information (document information a) that is currently being browsed on the terminal apparatus 2.

The download document determination unit 101 refers to the hierarchical structure of the document information 111 in the storage section 11, searches for document information stored in the same folder as the document information a, and defines the found document information as the document information d.

Radio Wave Degraded Period: Ten Minutes or More

In the case where the period from the degradation of the radio wave condition until the recovery of the radio wave condition is equal to or more than ten minutes, the download document determination unit 101 determines, as the document information to be downloaded, in addition to the document information a, the document information b, the document information c, and the document information d, document information (document information e) which has been downloaded before reaching the current location in the case where the terminal apparatus 2 was in the same location as the current location in the past.

The download document determination unit 101 searches for, based on the download location history information 112 illustrated in FIG. 4 and the download history information 113 illustrated in FIG. 5, document information which has a history of being downloaded within a certain range of time before reaching the same location as the current location of the terminal apparatus 2 by the same user, and defines the found document information as the document information e.

In the above determination operation of the download document determination unit 101, document information with "No" in the browsing field of the download history information 113 illustrated in FIG. 5 may be excluded from the document information to be downloaded. Accordingly, document information which has only been downloaded but not actually been browsed on the terminal apparatus 2 is excluded.

Next, the document information transmitting unit 102 transmits the document information determined by the download document determination unit 101 to the terminal apparatus 2 (S22).

Furthermore, the history recording unit 103 records, as the download location history information 112, the document information transmitted by the document information transmitting unit 102 and the location information of the terminal apparatus 2 in association with each other, and records, as the download history information 113, the document information, the identification information of the user of the terminal apparatus 2, and the date and time in association with one another (S23).

Furthermore, the history recording unit 103 may acquire, the location information and the date and time when the document information is browsed on the terminal apparatus 2, in place of the location information of the terminal apparatus 2 at the time when the document information is transmitted, and record the download location history information 112 and the download history information 113, based on the acquired location information and the date and time.

(4) Operation B of Terminal Apparatus

Figure 10:
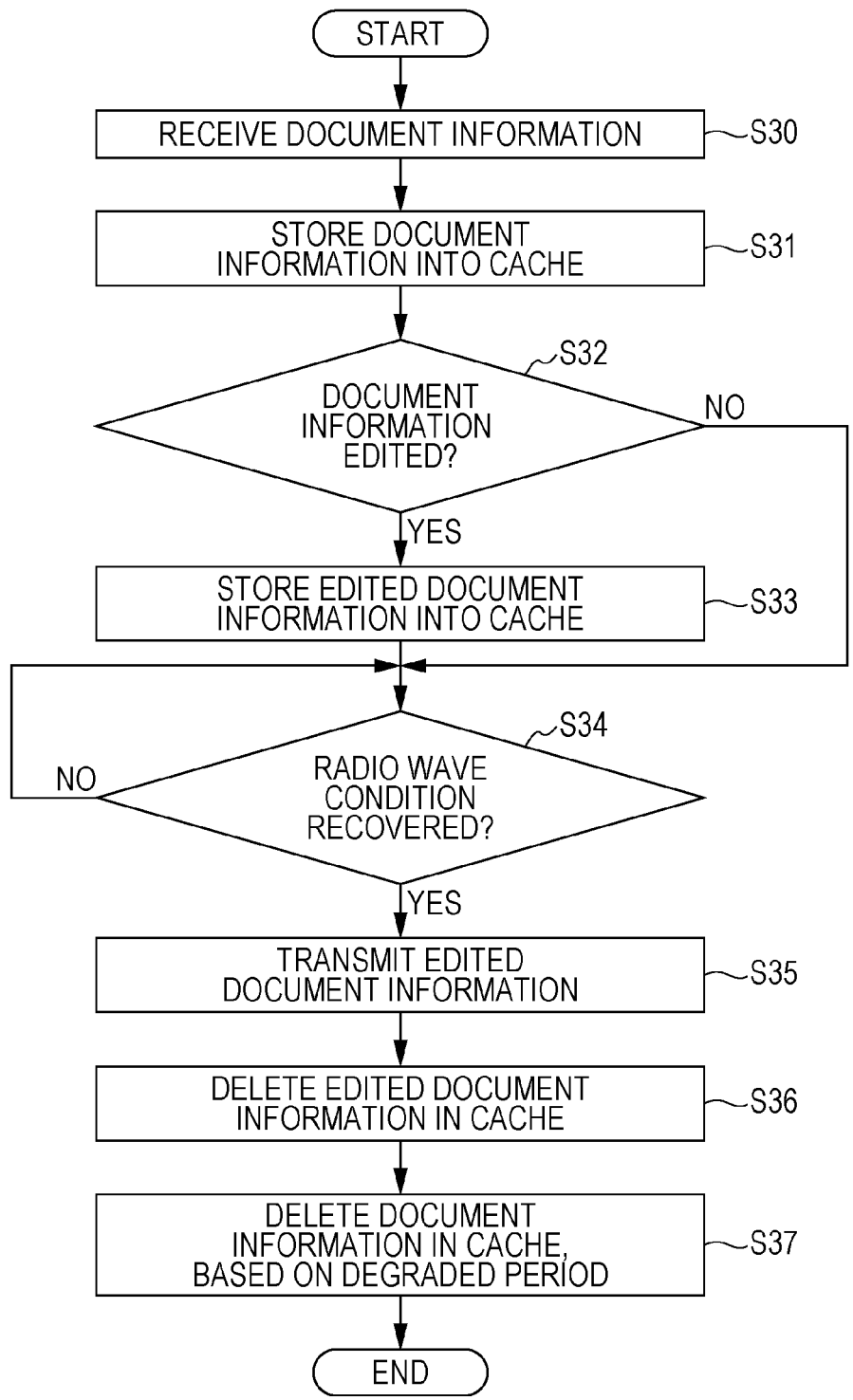
FIG. 10 is a flowchart illustrating an example of an operation of the terminal apparatus.

FIG. 10 is a flowchart illustrating an example of an operation of the terminal apparatus 2.

First, the document information receiving unit 203 receives the document information 213 from the document management server 1 (S30), and temporarily stores the document information 213 into the storage section 21 (S31).

Next, the document information browsing and editing unit 204 displays the content of the document information 213 on the display section 23 in accordance with operation content on the operation section 24 by the user 7, and edits the content. When the document information is edited (S32; Yes), the document information is temporarily stored as the edited document information 214 in the storage section 21 (S33).

Next, when the radio wave condition is recovered (S34; Yes), the edited document information transmitting unit 205 transmits (uploads) the edited document information 214, which has been edited by the document information browsing and editing unit 204, to the document management server 1 (S35), and issues a request to overwrite the content of the document information 111 on the document management server 1 by the edited document information 214.

When plural pieces of edited document information 214 exist, the edited document information transmitting unit 205 may collectively transmit the plural pieces of edited document information 214, may transmit the plural pieces of edited document information 214 in an order which is the reverse of the order in which the plural pieces of document information 214 were edited, or may transmit the plural pieces of edited document information 214 in descending order of the amount of editing. Furthermore, the edited document information transmitting unit 205 may transmit the plural pieces of edited document information 214 in the same order as the determination method of the download document determination unit 101 mentioned above or may transmit the plural pieces of edited document information 214 in the reverse order.

Next, the document information browsing and editing unit 204 deletes the edited document information 214 which has been transmitted to the document management server 1 (S36), and deletes the document information 213 which is temporarily stored (S37).

The document information browsing and editing unit 204 may collectively erase the temporarily stored plural pieces of document information 213, may erase the plural pieces of document information 213 in the same order as the determination method of the download document determination unit 101 mentioned above, or may erase the plural pieces of document information 213 in the reverse order.

Other Exemplary Embodiments

The present invention is not limited to the exemplary embodiment described above, and various modifications may be made to the present invention without departing from the scope of the present invention. For example, part or all of the individual units 100 to 103 of the document management server 1 may be implemented by the terminal apparatus 2. Alternatively, part or all of the individual units 200 to 203 of the terminal apparatus 2 may be implemented by the document management server 1.

In the exemplary embodiment described above, functions of the individual units 100 to 103 of the controller 10 and the individual units 200 to 205 of the controller 20 are implemented by a program. However, part or all of the individual units may be implemented by hardware, such as an application specific integrated circuit (ASIC). Furthermore, the program used in the exemplary embodiment described above may be stored in a recording medium, such as a compact disc-read only memory (CD-ROM), and provided. Furthermore, replacement, deletion, addition, and the like of the steps explained in the exemplary embodiment described above may be made without departing from the gist of the present invention.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A document management apparatus comprising:
a hardware processor configured to:
transmit a first document to a terminal apparatus in response to a request from the terminal apparatus;
determine, based on a period of time for which it is predicted that communication between the terminal apparatus and the document management apparatus will be disabled, a second document that is related to the first document; and
transmit the second document to the terminal apparatus in response to determining that the document management apparatus will be disabled.

2. The document management apparatus according to claim 1, wherein the hardware processor is further configured to determine the second document, using location information of the terminal apparatus and at least one of information on a document associated with the location information and information on a document associated with a user of the document.

3. The document management apparatus according to claim 1, wherein the period of time is predicted using location information of the terminal apparatus and radio wave condition information which associates the location information with a radio wave condition.

4. A terminal apparatus comprising:
a hardware processor configured to:
receive a first document, which is requested by the terminal apparatus, from a document management apparatus;
predict a period of time during which communication between the document management apparatus and the terminal apparatus will be disabled;
transmit a prediction result to the document management apparatus;
receive a second document, which is determined to be related to the first document by the document management apparatus based on the period of time, from the document management apparatus;
edit at least one of the first and the second documents; and
transmit, in response to the communication with the document management apparatus is recovered, at least one of the first and the second documents, which was edited by the hardware processor while the communication was disabled, to the document management apparatus.

5. The terminal apparatus according to claim 4, wherein the hardware processor is further configured to determine an order of transmission of at least one of the first and the second documents, which has been edited, using the period of time during which the communication is disabled.

6. The terminal apparatus according to claim 4, wherein the hardware processor is further configured to delete the second document in response to the communication with the document management apparatus is recovered.

7. The terminal apparatus according to claim 6, wherein the hardware processor is further configured to receive a plurality of second documents, and wherein
an order of deletion of the second documents is determined using the period of time during which the communication was disabled.

8. A document management system comprising:
a hardware processor configured to:
transmit a first document to a terminal apparatus in response to a request from the terminal apparatus;

predict a period of time during which communication between the terminal apparatus and a document management apparatus will be disabled;

determine, using the predicted period of time, a second document is related to the first document;

transmit the second document to the terminal apparatus; and receive the second document.

9. A non-transitory computer readable medium storing a program causing a computer to execute a process for document management, the process comprising:

transmitting a first document to a terminal apparatus in response to a request from the terminal apparatus;

determining, based on a period of time for which it is predicted that communication between the terminal apparatus and the document management apparatus will be disabled, a second document is related to the first document; and transmitting the second document to the terminal apparatus.

10. The document management apparatus according to claim 1, wherein the hardware processor is further configured to determine the second document in response to a document information which has a history of being downloaded within a predetermined distance from the terminal apparatus and has been accessed within three days of the user accessing the first document.

11. The document management apparatus according to claim 1, wherein the hardware processor is further configured to determine the second document in response to a time from the disablement of the communication between the terminal apparatus and the document management apparatus to a recovery of the communication is greater than one minute and less than three minutes and a document information which has a history of being downloaded within a predetermined distance from the terminal apparatus.

12. The document management apparatus according to claim 1, wherein the hardware processor is further configured to determine the second document in response to a time from the disablement of the communication between the terminal apparatus and the document management apparatus to a recovery of the communication is greater than three minutes and less than 10 minutes and a document information which has a history of being downloaded within a predetermined distance from the terminal apparatus.

13. The document management apparatus according to claim 1, wherein the hardware processor is further configured to determine the second document in response to a time from the disablement of the communication between the terminal apparatus and the document management apparatus to a recovery of the communication is greater than or equal to ten minutes and a document information which has a history of being downloaded within a predetermined distance from the terminal apparatus.

14. The document management apparatus according to claim 1, wherein the hardware processor is further configured to:

edit at least one of the first and second documents during a period of time that the communication between the terminal apparatus and the document management apparatus is disable; and transmit, in response to the communication between the terminal apparatus and the document management apparatus is reestablished, the edited information to document management system.

15. The document management apparatus according to claim 14, wherein the hardware processor is further configured to delete the edited information from a storage in response to the edited document information being transmitted to the document management apparatus.

* * * * *